(12) United States Patent
Zhang et al.

(10) Patent No.: US 9,962,888 B2
(45) Date of Patent: May 8, 2018

(54) SYSTEM FOR PRODUCING A FULLY IMPREGNATED THERMOPLASTIC PREPREG

(71) Applicant: JOHNS MANVILLE, Denver, CO (US)

(72) Inventors: Mingfu Zhang, Highlands Ranch, CO (US); Klaus Friedrich Gleich, Nuremberg (DE); Asheber Yohannes, Littleton, CO (US); Michael John Block, Centennial, CO (US); Jawed Asrar, Englewood, CO (US); Derek Cooper Bristol, Littleton, CO (US); Christopher P Sandoval, Littleton, CO (US)

(73) Assignee: Johns Manville, Denver, CO (US)

( * ) Notice: Subject to any disclaimer, the term of this patent is extended or adjusted under 35 U.S.C. 154(b) by 0 days. days.

(21) Appl. No.: 15/408,992

(22) Filed: Jan. 18, 2017

(65) Prior Publication Data

US 2017/0120544 A1     May 4, 2017

Related U.S. Application Data

(63) Continuation of application No. 14/794,634, filed on Jul. 8, 2015.

(51) Int. Cl.
*B05D 1/40* (2006.01)
*B29C 70/50* (2006.01)
(Continued)

(52) U.S. Cl.
CPC ............ *B29C 70/50* (2013.01); *B05D 1/40* (2013.01); *B05D 3/0272* (2013.01); *B29B 13/02* (2013.01);
(Continued)

(58) Field of Classification Search
CPC .......... B29C 70/50; B29C 70/06; B05D 1/40; B05D 3/0272; B05D 3/0227; B29B 13/02;
(Continued)

(56) References Cited

U.S. PATENT DOCUMENTS 3,347,818 A   10/1967 Lau et al.
4,495,017 A   1/1985 Abe et al.
(Continued)

FOREIGN PATENT DOCUMENTS

WO      2013056845 A2    4/2013

*Primary Examiner* — Kirsten Jolley
(74) *Attorney, Agent, or Firm* — Robert D. Touslee

(57) ABSTRACT

According to one embodiment, a system for manufacturing a fully impregnated thermoplastic prepreg includes a mechanism for moving a fabric or mat and a drying mechanism that removes residual moisture from at least one surface of the fabric or mat. The system also includes a resin application mechanism that applies a reactive resin to the fabric or mat and a press mechanism that presses the coated fabric or mat to ensure that the resin fully saturates the fabric or mat. The system further includes a curing oven through which the coated fabric or mat is moved to polymerize the resin and thereby form a thermoplastic polymer so that upon exiting the oven, the fabric or mat is fully impregnated with the thermoplastic polymer. During at least a portion of the process, humidity in the vicinity of the coated fabric or mat is maintained at substantially zero.

13 Claims, 4 Drawing Sheets

(51) Int. Cl.
| | |
|---|---|
| *B05D 3/02* | (2006.01) |
| *B29B 13/02* | (2006.01) |
| *B29B 13/06* | (2006.01) |
| *B29B 15/12* | (2006.01) |
| *B29K 105/08* | (2006.01) |
| *B29K 105/00* | (2006.01) |
| *B05C 9/12* | (2006.01) |
| *B05C 9/10* | (2006.01) |

(52) U.S. Cl.
CPC ............ *B29B 13/06* (2013.01); *B29B 15/122* (2013.01); *B05C 9/10* (2013.01); *B05C 9/12* (2013.01); *B29K 2105/0872* (2013.01); *B29K 2105/256* (2013.01)

(58) Field of Classification Search
CPC .................. B29B 13/06; B29B 15/122; B29K 2105/0872; B29K 2105/089; B05C 9/10; B05C 9/12; B05C 9/14
USPC .......................... 427/314, 369; 118/122, 123
See application file for complete search history.

(56) References Cited

U.S. PATENT DOCUMENTS

| | | | |
|---|---|---|---|
| 5,374,385 A * | 12/1994 | Binse .................... | B29C 70/521 156/166 |
| 5,424,388 A | 6/1995 | Chen et al. | |
| 5,780,099 A | 7/1998 | Gilligan | |
| 5,837,181 A * | 11/1998 | Leimbacher ........... | C08G 69/14 264/134 |
| 8,123,887 B2 | 2/2012 | Green | |
| 2005/0214465 A1 | 9/2005 | Maskus et al. | |
| 2012/0107509 A1* | 5/2012 | Scherzer ............... | B29C 67/246 427/381 |
| 2013/0165585 A1 | 6/2013 | Tadepalli et al. | |
| 2013/0221555 A1 | 8/2013 | Radtke et al. | |
| 2013/0295806 A1* | 11/2013 | Imai ........................ | C08J 3/226 442/59 |
| 2015/0145165 A1 | 5/2015 | Zhang et al. | |

\* cited by examiner

SYSTEM FOR PRODUCING A FULLY IMPREGNATED THERMOPLASTIC PREPREG

CROSS-REFERENCE TO RELATED APPLICATIONS

This application is a continuation of pending U.S. patent application Ser. No. 14/794,634, filed Jul. 8, 2015. This application is related to U.S. patent application Ser. No. 14/088,034 filed Nov. 22, 2013, and titled "FIBER-CONTAINING PREPREGS AND METHODS AND SYSTEMS OF MAKING," the entire disclosure of which is hereby incorporated by reference, for all purposes, as if fully set forth herein.

BACKGROUND

The use of fiber-reinforced composites is growing in popularity with applications in transportation, consumer goods, wind energy, and infrastructure. Some of the many reasons for choosing composites over traditional materials such as metals, wood, or non-reinforced plastics include reduced weight, corrosion resistance, and improved mechanical strength. Within the field of fiber-reinforced polymeric composites, thermoplastics are increasingly being used in place of thermosets as the matrix resin due to better durability, recyclability, thermoformability, improved throughput, lower material cost, and lower manufacturing cost.

Many continuous fiber reinforced thermoplastic composites are produced from impregnated tapes. These impregnated tapes may be unidirectional fiber tapes that are impregnated with a thermoplastic resin. These can be layered and thermoformed to produce a wide variety of composites of the desired shape and strength. There are significant challenges associated with producing impregnated tapes at low cost and high quality. Traditionally thermoplastic resins are melted and applied to fibers, but molten thermoplastic resins have very high viscosity and, when combined with the high fiber content that is desired, results in incomplete resin impregnation and/or low throughput. What is desired is a continuous manufacturing process with high throughput that produces fully impregnated thermoplastic prepregs without defects and good coupling between the fibers and the matrix resin. For the conventional partially impregnated thermoplastic prepregs, high pressure is needed in the consolidation step to promote additional impregnation, which introduces excessive flow of the resin matrix and causes detrimental changes in fiber orientation in the finished parts. The fully impregnated thermoplastic prepregs of the instant invention are advantageous in achieving the desired properties in final composite parts, as no additional impregnation is needed in the consolidation step.

BRIEF SUMMARY

The embodiments described herein provide fully impregnated thermoplastic prepreg products, and specifically systems and methods for making the same. According to one aspect, a system for manufacturing a fully impregnated thermoplastic prepreg in a continuous process is provided. The system includes a mechanism for moving a fabric or mat from a starting point to an ending point where the fabric or mat is subjected to a plurality of processes. The fabric or mat is in substantially constant movement between the starting point and ending point, meaning that the fabric or mat is not halted or interrupted for an extended period in order to perform any one given step. The system also includes a drying mechanism that is configured to remove residual moisture from at least one surface of the fabric or mat as the fabric or mat is moved past the drying mechanism. The system further includes a resin application mechanism that is configured to apply a resin comprising a monomer or oligomer to the fabric or mat as the fabric or mat is moved past the resin application mechanism. The system may additionally include a mixing mechanism that mixes the monomer or oligomer with a catalyst and/or an activator prior to application of the reactive resin mixture to the fabric or mat. The catalyst and activator facilitate in polymerizing the monomer or oligomer to form a thermoplastic polymer. In an exemplary embodiment, the resin comprises caprolactam.

The system additionally includes a press mechanism that is configured to press the monomer or oligomer through the fabric or mat as the fabric or mat is moved past or through the press mechanism so that the monomer or oligomer fully saturates the fabric or mat. The system additionally includes a curing oven having a temperature of greater than 120° C., which is sufficient to effect polymerization of the monomer or oligomer to form the thermoplastic polymer as the fabric or mat is moved through the oven. Upon polymerization of the monomer or oligomer, the fabric or mat is fully impregnated with the resulting thermoplastic polymer. In some embodiments, the press mechanism and the oven are combined in a single mechanism, such as a double belt compression oven that sandwiches the fabric or mat between two adjustable compression belts. The system is configured to maintain a temperature of the monomer or oligomer to between 70 and 120° C. prior to passing the fabric or mat through the oven in order to reduce or eliminate premature polymerization of the monomer or oligomer. The system is further configured to maintain an environment in the vicinity of the fabric or mat that is coated with the monomer or oligomer to a substantially moisture-free atmosphere prior to subjecting the coated fabric or mat to the oven in order to isolate the reactive resin components from atmospheric moisture and thereby achieve high conversion of the monomer or oligomer to the thermoplastic polymer. As used herein, a substantially moisture-free atmosphere means the humidity in the atmosphere is substantially zero. It should be realized that the term "substantially moisture-free" or "substantially zero" in references to humidity allows for or encompasses some level or amount of humidity to be present in the air, but in such instances the humidity in the air is negligible, minor, insignificant, or otherwise inconsequential.

In some embodiments, the system additionally includes a mixing mechanism that is configured to mix the monomer or oligomer with the catalyst and the activator prior to the application of the reactive resin mixture to the fabric or mat. In such embodiments, the system may include a first holding tank and a second holding tank that is separate from the first holding tank. The first holding tank may contain a first mixture that includes the monomer or oligomer and the catalyst while the second holding tank contains a second mixture that includes the monomer or oligomer and the activator. The first mixture and the second mixture may be mixed in the mixing mechanism, such as a mixing head or static mixer. The fluid lines between the first and second holding tanks and the mixing mechanism may be heated and/or insulated to maintain the monomer or oligomer at between 70 and 120° C.

In some embodiments, the system includes a single holding tank that comprises a mixture of the monomer or oligomer and either the catalyst or the activator. In such embodiments, the activator or the catalyst that is not included within the single holding tank may be pre-applied to the fibers of the fabric or mat, or contained within a separate holding tank.

In some embodiments, the system additionally includes a mechanism that is configured to maintain a substantially moisture-free environment in the vicinity of the coated fabric or mat prior to subjecting the coated fabric or mat to the oven in order to isolate the reactive components from atmospheric moisture and thereby achieve high conversion of the monomer or oligomer to the thermoplastic polymer. One example of such mechanism may be a gas application system that is configured to blow a moisture-free gas onto one or more surfaces of the coated fabric or mat. In such embodiments, the gas application mechanism may blow nitrogen gas onto one or more surfaces of the moving fabric or mat. Another example of such a mechanism is to enclose the resin application mechanism and the coated fabric or mat in a box, which is filled with a moisture-free gas. The system may additionally include a winding mechanism that is configured to roll the fully impregnated fabric or mat into a roll product after the fabric or mat exits the curing oven.

According to another aspect, a system for manufacturing a prepreg includes a mechanism for moving a fabric or mat along the system and a drying mechanism that removes residual moisture from at least one surface of the fabric or mat. The system also includes a resin application mechanism that applies a resin to the fabric or mat and a press mechanism that presses the fabric or mat subsequent to application of the resin to ensure that the resin fully saturates the fabric or mat. The system further includes a curing oven through which the fabric or mat is moved to polymerize the resin and thereby form a thermoplastic polymer so that upon exiting the oven, the fabric or mat is fully impregnated with the thermoplastic polymer. During at least a portion of the process, the environment in the vicinity of the coated fabric or mat is maintained substantially moisture-free in order to isolate the reactive components from atmospheric moisture and thereby achieve high conversion of the resin (i.e., monomer or oligomer) to the thermoplastic polymer.

The system may additionally include a mixing mechanism that mixes the monomer or oligomer with a catalyst and an activator prior to application of the reactive resin mixture to the fabric or mat. In such embodiments, the system may include a first holding tank and a second holding tank that is separate from the first holding tank. The first holding tank may contain a mixture of the monomer or oligomer and the catalyst while the second holding tank contains a mixture of the monomer or oligomer and the activator.

The system may additionally include a gas application mechanism that applies a moisture-free gas onto one or more surfaces of the fabric or mat to maintain the substantially moisture-free environment. The system may additionally include a winding mechanism that winds the fully impregnated fabric or mat into a roll product after the fabric or mat exits the oven.

According to another aspect, a method of forming a fully impregnated thermoplastic prepreg product includes moving a fabric or mat from a starting point to an ending point where the fabric or mat is subjected to a plurality of processes and where the fabric or mat is in substantially constant movement between the starting point and ending point. The method also includes drying the fabric or mat to remove residual moisture from one or more surfaces of the fabric or mat and mixing a monomer or oligomer with a catalyst and an activator to form a reactive resin mixture. The catalyst and activator facilitate in polymerizing the monomer or oligomer to form a thermoplastic polymer. The method further includes applying the reactive resin mixture to the fabric or mat and passing the reactive resin mixture coated fabric or mat through a calendar or press to press the reactive resin mixture entirely through the fabric or mat so that the reactive resin mixture fully saturates the fabric or mat. In preferred embodiments, the resin (i.e., monomer or oligomer) comprises caprolactam. The reactive resin mixture comprising caprolactam has a viscosity of 10 centipoises or less, which enables the reactive resin mixture to easily flow through and saturate the fabric or mat. The method additionally includes passing the reactive resin mixture coated fabric or mat through a curing oven to polymerize the reactive resin mixture and thereby form the thermoplastic polymer. During at least a portion of the above method, an environment in the vicinity of the coated fabric or mat is controlled to maintain a substantially moisture-free environment.

In some embodiments, a portion of the monomer or oligomer is mixed with the catalyst in a first tank and a portion of the monomer or oligomer is mixed with the activator in a second tank that is separate from the first tank. In such embodiments, mixing the monomer or oligomer with the catalyst and the activator may include mixing the materials from the first tank and the second tank in a static mixer, prior to applying the reactive resin mixture to the fabric or mat.

In some embodiments, the method additionally includes applying a moisture-free gas onto one or more surfaces of the reactive resin mixture coated fabric or mat to maintain a substantially moisture-free environment in the vicinity of the coated fabric or mat. In such embodiments, nitrogen gas may be applied to the one or more surfaces of the reactive resin mixture coated fabric or mat. In some embodiments, the curing oven comprises a double belt compression oven and/or the method additionally includes winding the fully impregnated fabric or mat into a roll product. The method is sufficient to achieve greater than 90%, 95%, 98%, or even 99% conversion or the monomer or oligomer to the thermoplastic polymer. Post-polymerization may be carried out when the prepregs are reheated during the process of making composites. Post-polymerization further increases the conversion and molecular weight.

According to another aspect, a method of forming a fully impregnated thermoplastic prepreg product includes applying a pre-polymerized resin mixture to a fabric or mat where the pre-polymerized resin (i.e., monomer or oligomer) is combined with a catalyst and an activator that facilitate in polymerizing the reactive resin mixture to form a thermoplastic polymer. The method also includes passing the reactive resin mixture coated fabric or mat through a calendar or press to fully saturate the fabric or mat with the reactive resin mixture and passing the coated fabric or mat through a curing oven to polymerize the pre-polymerized resin and thereby form the thermoplastic polymer. During at least a portion of the process, the environment in the vicinity of the coated fabric or mat is maintained substantially moisture-free. The process occurs in a time of 20 minutes or less, 10 minutes or less, or 5 minutes or less.

The method may further include drying the fabric or mat prior to application of the pre-polymerized resin to remove residual moisture from one or more surfaces of the fabric or mat. In some embodiments, the catalyst and the activator may be combined with the pre-polymerized resin by mixing the pre-polymerized resin with the catalyst and the activator prior to applying the reactive resin mixture to the fabric or mat. In other embodiments, the fibers of the fabric or mat include the activator or the catalyst and the method further includes applying the reactive resin mixture to the activator or catalyst coated fabric or mat. The method may additionally include applying a moisture-free gas to one or more surfaces of the coated fabric or mat to maintain the substantially moisture-free environment in the vicinity of the coated fabric or mat and/or winding the fully impregnated fabric or mat into a roll product.

BRIEF DESCRIPTION OF THE DRAWINGS

The present technology is described in conjunction with the appended figures.

Figure 1A:
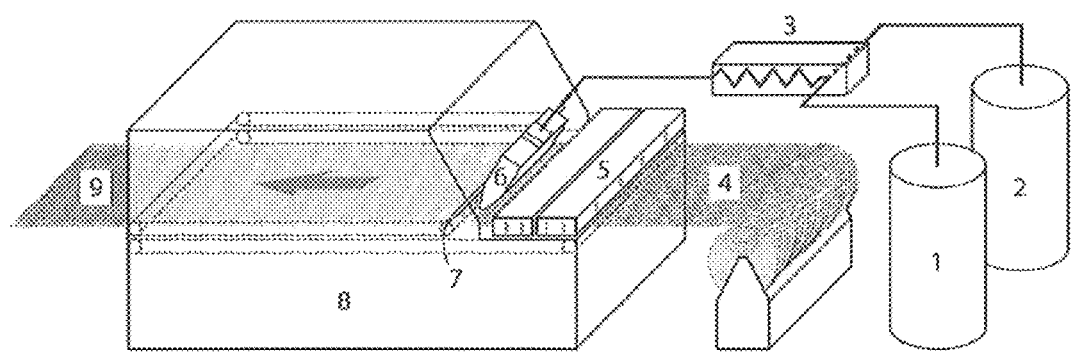
FIGS. 1A and 1B illustrate systems that may be used to produce prepregs that are fully impregnated with a thermoplastic polymer.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The embodiments described herein relate to fully impregnated thermoplastic prepreg products, and specifically systems and methods for making the same. The prepreg products are fully impregnated with thermoplastic materials that allow the prepreg products to be reheated and molded into a given shape. The prepreg products are made using reactive resin materials, specifically monomers and oligomers. For example, in an exemplary embodiment the resin material is caprolactam, which is extremely sensitive to moisture, wherein even a small amount of moisture can affect the anionic polymerization of the caprolactam. Because of the high moisture sensitivity of these materials, achieving a high conversion rate of the reactive resin materials to polymers is very difficult.

In order to achieve a commercially viable prepreg product using monomer or oligomer materials (hereinafter resins, reactive resins, or resin materials), the conversion of the reactive resin to a polymer needs to be greater than 90% and more commonly greater than 95%. Higher molecular weights of the thermoplastic polymers are also typically desired. In preferred embodiments the resin material comprises caprolactam. The reactive resin material comprising caprolactam is extremely sensitive to moisture. The presence of moisture can stop or interfere with the anionic polymerization of caprolactam into a polyamide-6 (PA-6) polymer. For example, a moisture content of greater than 200 ppm in the resin can significantly interfere with the polymerization process and lower the conversion of the caprolactam material to below 90%. The term "substantially moisture-free" or "substantially zero" in references to humidity recognizes that some level or amount of humidity may be present in the air. However, as used herein the term implies that any humidity present in the air is negligible, minor, insignificant, or otherwise inconsequential.

The systems and methods described herein are useful for manufacturing prepreg products using reactive resin materials. The resin conversion rate that is achieved via the systems and methods described herein is greater than 90% and more commonly greater than 95%. In most embodiments, the conversion rate of the resins is greater than 98% or even greater than 99%. In addition, the systems and methods described herein are able to achieve this high conversion rate utilizing a continuous process, wherein a fabric or mat material (woven or nonwoven) is essentially moved constantly or continually throughout the manufacturing process. The continuous process greatly increases the efficiency of the manufacturing process, which decreases the overall cost of the final prepreg product. For example, the manufacturing time between coating of the pre-polymerized resin (e.g., caprolactam) to the formation of a fully impregnated thermoplastic prepreg may be less than 20 minutes and commonly less than 10 minutes. In many embodiments, this processing time may be less than 5 minutes.

The systems and methods described herein are also able to achieve full and complete impregnation of the prepreg with the thermoplastic polymer. The low viscosity of the reactive resin material allows that the resin to easily penetrate within and saturate the fabric or mat. The low viscosity of the reactive resin allows the resin to flow within and fully saturate either a single layer of the fabric or mat, or multiple layers of these materials. Accordingly, the systems and methods described herein are capable of producing prepregs that include multiple layers of materials with each layer being fully saturated or impregnated with the thermoplastic polymer materials. The final prepreg product can be made flexible with high content of reinforcing fibers. Because the prepreg products are flexible, the prepregs may be rolled into a rolled product.

The embodiments described herein provide a process and apparatus that utilizes mixing of reactive resin components, followed by application of the reactive resin components to a fibrous media. The reactive resin components are then cured in an oven to form a fully impregnated prepreg having a thermoplastic polymer matrix. In a specific embodiment, caprolactam is polymerized to form polyamide-6 in the finished prepreg. The system is designed to isolate the reactive resin components from atmospheric moisture in order to achieve high conversion from monomer to polymer. Specifically, the system is designed to ensure a substantially moisture-free environment in the vicinity of the reactive resin coated fabric or mat (woven or nonwoven). The systems and methods described herein are designed to isolate the reactive components from atmospheric moisture in order to achieve high conversion from monomer to polymer. This is achieved, in part, by controlling the environment in the vicinity of the production process and/or by removing residual moisture from the fabric or mat (woven or nonwoven) and/or any of the processing systems.

As used herein, the reactive resin means the resin materials that comprise monomers or oligomers capable of polymerizing to form thermoplastic polymers. The reactive resins may include lactams such as caprolactam and laurolactam and lactones. In an exemplary embodiment, the reactive resin comprises caprolactam. In some embodiments, mixtures of monomers and/or oligomers may be used. For example, mixture of caprolactam and laurolactam may be used, which will copolymerize in the curing oven to form copolymers with tailored properties. As used herein, the activator may be any material that activates and accelerates the polymerization of monomers or oligomers. Exemplary activators for the anionic polymerization of caprolactam include blocked isocyanates and N-acylcaprolactams. As used herein, the catalyst may be any material that catalyzes the polymerization of monomers or oligomers. Exemplary catalysts for the anionic polymerization of caprolactam include alkaline salt of caprolactam such as sodium caprolactamate.

The term roving as used herein refers to a bundle of fibers that are positioned adjacent one another to form a rope, thread, or cord like component. A common type of fiber that is used in the rovings is glass fibers, although various other fibers could be used such as carbon fibers, basalt fibers, metal fibers, ceramic fiber, natural fibers, synthetic organic fibers such as aramid fibers, and other inorganic fibers. The term fabric or mat as used herein refers to woven or nonwoven materials. The woven materials are materials that are produced by weaving multiple roving strands together. The roving strands are commonly woven so that a first plurality of strands extend in a first direction (e.g., weft direction) and a second plurality of strands extend in a second direction that is typically orthogonal to the first direction (e.g., warp direction). The first plurality of strands are roughly parallel with one another as are the second plurality of strands. The woven fabrics or cloths may be unidirectional, where all or most of the roving strands run or extend in the same direction, or may be bidirectional, wherein the roving strands run in two, typically orthogonal, directions. Various weaves may be used to form the fabric or mats described herein, including: plain weaves, twill weaves, satin weaves, multiaxial weaves, or stitching. The woven cloths or fabrics that are employed may contain any kind of woven fabric or multi-axial fiber material. The fabrics or mats may also contain chopped fibers in addition to or alternatively from the continuous fibers. The fabrics or mats may be a hybrid from different type of fibers. For ease in describing the embodiments herein, the embodiments will generally refer to the use of glass fibers, although it should be realized that various other fiber types may be used.

As briefly described above, nonwoven fiber mats are used in addition to or in place of the woven reinforcement fabrics. The nonwoven fiber mats are commonly formed of fibers that are entangled or meshed together rather than being woven in a uniform direction. The nonwoven fiber mats exhibit more uniform strength characteristics in comparison to the woven reinforcement fabrics. Stated differently, the strength of the nonwoven fiber mats is typically less directionally dependent so that a more uniform strength is achieved regardless of which direction the mat is tensioned. In comparison, the strength of the woven reinforcement fabrics are directionally dependent whereby the fabrics or cloths exhibit substantially more strength in a direction aligned with the fibers and less strength in a direction misaligned from the fibers. The reinforcement fabrics or cloths are substantially stronger than the nonwoven mats when the tension is aligned with the fibers. For ease in describing the embodiments herein, the embodiments will generally refer to fabrics or mats, which is intended to apply to both woven fabrics or cloths and nonwoven fiber mats.

The fibers used in the fabrics or mats may be treated with a sizing composition including coupling agent(s) that promote bonding between reinforcing fibers and polymer resin. For example, the fibers may be sized with one or more coupling agents that covalently bond the thermoplastic resin to the fibers. Exemplary coupling agents may include coupling-activator compounds having a silicon-containing moiety and an activator moiety. Specific examples of coupling-activator compounds include 2-oxo-N-(3-(triethoxysilyl)propyl)azepane-1-carboxamide. Exemplary coupling agents may also include blocked isocyanate coupling compounds having a silicon-containing moiety and a blocked isocyanate moiety.

The term thermoplastic polymer or material refers to polymers that are capable of being melted and molded or formed into various shapes multiple times. As such, the fully impregnated thermoplastic prepregs may be positioned in a mold and reformed or remolded into various desired shapes. Examples of polymer materials or resins that may be used with the embodiments herein include polyamides, specifically including polyamide-6.

The description and/or claims herein may use relative terms in describing features or aspects of the embodiments. For example, the description and/or claims may use terms such as relatively, about, substantially, between, approximately, and the like. These relative terms are meant to account for deviations that may result in practicing and/or producing the embodiments described herein. For example, the description describes mixtures from two holding tanks as being mixed into a "substantially homogenous mixture". The disclosure also describes purging a fabric or mat with "a substantially moisture-free gas" and that the fabric or mat is in "substantially constant movement" between a starting point and ending point. The term "substantially" is used in these descriptions to account for small deviations or differences from a complete homogenous mixture, or a completely moisture-free gas, or an entirely constant movement. For example, a skilled artisan would recognize that the moisture-free gas may include some negligible amount of moisture and that some negligible amount of non-homogeneity may be present within the homogenous mixture. The skilled artisan would also recognize that some negligible stoppage or non-movement of the fabric or mat may occur without departing from the spirit of the disclosure herein. These deviations of differences may be up to about 10%, but are typically less than 5%, or even 1%. A similar rationale applies to any of the other relative terms used herein.

In producing conventional thermoplastic prepregs, the process of fully impregnating or saturating the fabric or mat is rather expensive and/or difficult due to the high melt viscosity of the thermoplastic resin. In some instances, a solvent is added to the polymer resin/thermoplastic material to reduce the viscosity of the material. While the reduced viscosity may add in fully impregnating the reinforcement fabric, the solvent needs to be subsequently removed from the fabric after the polymer resin/thermoplastic material is impregnated within the fabric. Removal of the solvent commonly involves heating the fabric to evaporate the solvent, adding cost and environmental concerns.

Other conventional technologies use pre-impregnated thermoplastic tapes of polymer resin and reinforcing fibers. These tapes are typically manufactured as a single layer by applying a molten polymer resin atop flattened rovings. For example, glass rovings may be passed over rollers to flatten and spread fibers that are then coated with a molten polymer resin. The tapes are then cooled with the glass fibers encased within the hardened polymer resin material. The tapes may then be used in producing other products, typically by stacking and welding several layers of tape together. The process of spreading fibers for resin impregnation typically limits to rovings; since spreading fibers in fabrics or mats is nearly impossible. In addition, the stacked tape is often rigid due to the polymer resin that impregnates the tape layers, which makes it difficult to mold intricate shapes.

In contrast to conventional prepregs, the production of the thermoplastic prepregs described herein is fast and simple. For example, fully saturating the fabric or mat is relatively easy since the resin materials (e.g., caprolactam) have a low viscosity that is comparable to water. This low viscosity allows the resin materials to easily flow within and fully saturate a single or multiple layers of the fabric or mat. The capillary force of the rovings or fibers further aids in saturating the fabric or mat. The low viscosity of these materials also allows the materials to be applied to a constantly or continually moving sheet of material. The resins may then be converted into a thermoplastic polymer material so that the resulting fabric or mat is fully impregnated with the thermoplastic material.

While the embodiment herein generally refers to the manufacture of polyamide-6 prepregs, other reactive resin systems can be easily adapted to work with the same or similar apparatus to form thermoplastic prepregs including other types of polyamides and blends of thermoplastic polymers such as the blends of polyamides and polyesters.

Having described several aspects of the embodiments generally, additional aspects will be evident with reference to the description of the several drawings provided below.

Systems

Figure 1B:
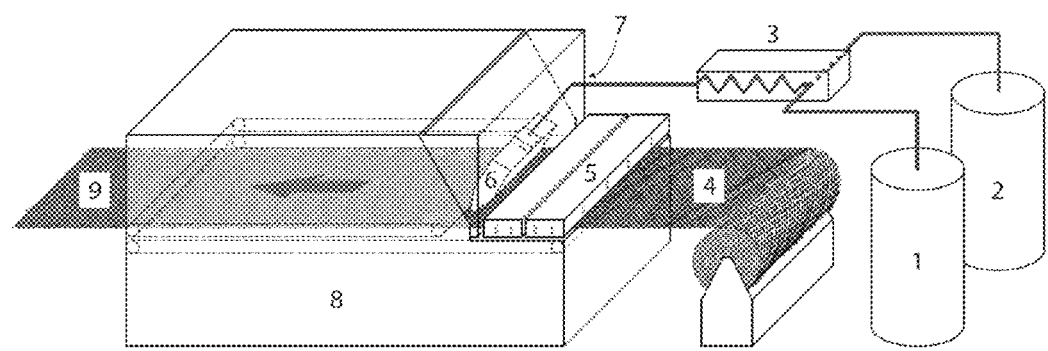

Referring now to FIGS. 1A and 1B, illustrated is a system that may be used to produce prepregs that are fully impregnated with a thermoplastic polymer. The systems of FIGS. 1A and 1B are capable of producing the fully impregnated thermoplastic prepregs in a continuous process, wherein a fabric or mat 4 is continually or constantly in movement through the system. Stated differently, the term continuous process means that the process is not interrupted or paused in performing any one process step. Rather, each step in the process is continually or constantly being performed. For example, the fabric or mat is continually moved from a rolled good, coated with the resin material, cured in the oven, and rolled into a final product. In contrast, conventional systems typically are halted or interrupted during the performance of one or more steps, such as the impregnation of fibrous substrates with high melt viscosity thermoplastic polymer resin.

In some embodiments, the system includes two vessels or holding tanks (i.e., 1 and 2 2). The holding tanks, 1 and 2, may be heated and purged with nitrogen to ensure the removal of any moisture, which could otherwise reduce the reactivity of the raw materials and consequently reduce the conversion of the resins to a polymer. One of the holding tanks (e.g., holding tank 1) may contain a mixture of a resin and a catalyst. In a specific embodiment, the holding tank (e.g., tank 1) includes caprolactam and a catalyst, such as sodium caprolactamate or any other catalyst. The other holding tank (e.g., tank 2) may contain a mixture of the resin and an activator. In a specific embodiment, the other holding tank (e.g., tank 2) includes caprolactam and an activator, such as caprolactam hexane di-isocyanate or any other activator. The holding tanks, 1 and 2, are heated to a temperature that allows the reactants to melt. In some embodiments, the temperature may be between about 70 and 120° C. The molten reactants (e.g., the resin and activator or catalyst) have a very low viscosity, for example, lower than 10 centipoises (cP).

The reactants from the two holding tanks, 1 and 2, are metered into a static mixer or mixing head 3 that ensures the correct ratio of the resin, activator, and catalyst. In one embodiment, the mixtures from the two holding tanks, 1 and 2, may be provided to the static mixer in a 1/1 ratio. The mixtures from the two holding tanks, 1 and 2, are thoroughly mixed in the static mixer 3 into a substantially homogenous mixture.

A fabric or mat 4 is unwound or otherwise provided to the system. The system may include a mechanism that unwinds the fabric or mat and moves the fabric or mat through the system and along or about the various processes. In some embodiments, the mechanism may include powered rollers or calendars and/or a conveyor system, that move the fabric or mat through the system.

In some embodiments, the activator is included on the surface of the fibers. The fabric or mat may consist of woven strands of continuous glass fibers that have been pre-treated with a sizing composition. For example, the sizing composition may include a coupling activator that covalently bonds the polymerization activator moiety to the glass fiber. In such instances, the bond between the thermoplastic polymer and the fibers may be significantly strengthened or enhanced. When the fabric or mat includes the activator, only a single holding tank (e.g., tank 1) containing the resin and catalyst may be used, or a reduce amount of the activator may be mixed with the resin in the second holding tank (e.g., tank 2). In some embodiments, two holding tanks, 1 and 2, may be used and each holding tank may include a different resin material. For example, a first holding tank 1 may include caprolactam while the second holding tank 2 includes cyclic butylene terephthalate (CBT). In such instances, a combination of two or more types of reactive monomers and/or oligomers may be applied to the fabric or mat.

In a specific embodiment, the fiber sizing contains a mixture of silane coupling agents, polymeric film formers, and other additives that are designed to enhance the interfacial bonding between the glass fiber and polyamide-6 matrix. Specifically, a reactive silane is used that allows some of the polymerization to be initiated directly from the glass surface, thus improving the coupling between the reinforcing fibers and the resin matrix to improve composite properties.

After the fabric or mat 4 is unwound, or during the unrolling of the fabric or mat, the fabric or mat may be subjected to a drying mechanism that removes residual moisture from one or more surfaces of the fabric or mat. For example, an infrared heater 5 may be used to raise the temperature of the fabric or mat and thereby remove any residual adventitious moisture. In a specific embodiment, the infrared heater 5 may be positioned atop or over the fabric or mat 4 to remove residual moisture. In some embodiments, a second heater can be positioned on an opposite side (e.g., bottom side) of the fabric or mat 4 to further aid in removal of residual moisture. In other embodiments, a pre-drying oven may be used in place of or in addition to the infrared heater 5. In some embodiments, the temperature of the drying mechanism may be greater than a polymerization temperature of the resin. In such instances, the drying mechanism should be positioned before the resin application mechanism to reduce the possibility of premature polymerization or reaction of the resin material. The preheating of the fabric or mat 4, and/or the preheating of the resin, may be employed to prevent the monomer/oligomer from solidifying upon contact with the fibers of the fabric or mat, which may ensure a good wet out of the resin at higher line speeds.

The resin mixture is then applied to the fabric or mat 4 using a slot die 6 or other resin application mechanism. The slot die 6 may be positioned atop or adjacent one or more surfaces of the fabric or mat 4. The resin mixture is typically applied as close as possible to an inlet of the curing oven 8 in order to minimize exposure of the resin material to the surrounding air. To minimize exposure to the surrounding air, the slot die 6 may be positioned directly adjacent to the inlet of the curing oven 8. In some embodiments, the slot of the slot die 6 may have an opening of about 1.0 mm or less that enables the use of a very thin die. The thin die allows the distal end of the die to be positioned substantially close to the curing oven 8 to minimize the exposure of the resin mixture to the surrounding environment. In some embodiment, the distal end of the slot die 6 may be positioned within 1.0 inches of the curing oven's inlet, and preferably within 0.5 inches of the inlet. The slot die 6 may be temperature controlled between a temperature of 70° C. and 120° C. The slot die 6 may include a thermocouple and heating cartridge or other heating component to ensure that the slot die 6 remains within the desired temperature range.

While the embodiment herein utilizes a slot die 6 for application of the resin mixture to the fabric or mat 4, the low viscosity of such systems allows a wide range of application technologies including, but not limited to, spray application, curtain coating, dip and squeeze coating, kiss roll application, doctor blade application, or even powder coating of pre-ground solid resins where the curing oven can also be utilized to melt the reactive components.

The liquid handling lines between the two holding tanks, 1 and 2, and the static mixer 3 and/or between the mixer 3 and the slot die 6 are typically insulated to minimize heat loss as the resin mixtures flow through the handling lines. In some embodiments, the liquid handling lines are heated in addition to being insulated to ensure that the liquid materials (e.g., resins, catalyst, and activator) are maintained within a constant temperature range. Specifically, the liquid transport lines between the holding tanks, 1 and 2, (or solitary holding tank) and the mixer 3 and/or between the mixer 3 and the slot die 6 are insulated and heated to maintain the liquid materials at between 70 and 120 degrees Celsius. Controlling the temperature of the liquid materials ensures that the resin does not solidify and/or prematurely react within the handling lines.

In the above process, the temperature of the resin is typically maintained at between 70 and 120 degrees Celsius in order to maintain the resin in a liquid or molten state while preventing premature polymerization of the resin prior to the curing of the material in the oven. The resin components may need to be recirculated, such as between one or more holding tanks, 1 and 2, and the mixer 3. Ensuring that the resin is maintained at a temperature between 70 and 120° C. is important to minimizing or eliminating premature resin polymerization and/or material build up in the system and/or liquid handling lines.

Of equal importance is the controlling the surrounding environment in the vicinity of the coated fabric or mat 4 to ensure that the resin mixture is not exposed to ambient moisture. Exposure of the resin mixture to ambient moisture may reduce the conversion of the resin, which may result in a resin to polymer conversion rate of less than 90%. The systems of FIGS. 1A and 1B are designed to isolate the resin mixture (i.e., reactive components) from atmospheric moisture in order to achieve high conversion from monomer/oligomer to polymer. In some embodiments, the entire system may be housed or enclosed in a room or area in which the environment is controlled to maintain a substantially moisture-free environment. Various dehumidification techniques can be used to remove moisture from the ambient air in the room or area. Exemplary dehumidification techniques include desiccant dehumidification, refrigerant dehumidification, and electrostatic dehumidification. In other embodiments, the system may employ a moisture purge mechanism that is operable to ensure that the humidity in the air surrounding the coated fabric or mat is substantially zero. In such embodiments, the moisture purge mechanism need be employed only in the vicinity of the slot die 6 since the fabric or mat 4 is free of the resin material prior to this point. The moisture purge mechanism may be positioned proximally of the slot die 6 or distally of the slot die 6 as desired. In either instance, however, the moisture purge mechanism should be positioned relatively close to the slot die 6 to minimize exposure of the resin mixture to the surrounding air. For example, the system may be enclosed in an area that is purged with a substantially moisture-free gas.

In a specific embodiment, the moisture purge mechanism includes an air/gas plenum or tube 7 of FIG. 1A that blows a moisture-free gas onto one or more surfaces of the coated fabric or mat 4. The air/gas plenum or tube 7 may be positioned atop the fabric or mat 4, or may be positioned on opposite sides of the fabric or mat as desired. In a specific embodiment, the air/gas plenum or tube 7 blows dry nitrogen atop or across either or both the top surface or the bottom surface of the fabric or mat 4. The air/gas plenum or tube 7 ensure that the area or vicinity around or adjacent the coated fabric or mat 4 and/or in the vicinity of the curing oven's inlet is kept substantially free of moisture. Minimizing the exposure of the resin material to moisture is critical to ensuring a high conversion rate of the resin material. Accordingly, the use of the drying mechanism (e.g., infrared heater 5) and/or moisture purge mechanism (e.g., air/gas plenum) is important to ensuring proper manufacturing of the prepreg. In another specific embodiment, the resin application mechanism as well as the coated fabric or mat may be enclosed in a box 7, as shown in FIG. 1B, that is purged with a substantially moisture-free gas.

After the fabric or mat 4 is coated and/or saturated with the resin and/or purge gas is applied to one or more surfaces of the coated fabric or mat 4, the resin impregnated fabric or mat 4 is then passed through a curing oven 8. The temperature of the curing oven 8 is maintained to ensure the completion of the polymerization of the resin to a thermoplastic polymer. Stated differently, the curing oven 8 is maintained above a polymerization temperature at which the monomers and/or oligomers start to polymerize. For a reactive resin composition that includes caprolactam, the polymerization temperature may be about 120° C. or more (e.g., about 120° C. to about) 220°. For prepreg manufacturing processes where the polymerized resin matrix is not melted, an upper limit on the polymerization temperature for the monomers and/or oligomers may be the melting temperature of the polymer. For example, a reactive resin composition that includes caprolactam may have a upper limit of a polymerization temperature that is the melting temperature of the PA-6 polymer (i.e., ~220° C.). The coated fabric or mat 4 may be exposed to the curing oven 8 for a time which is sufficient to ensure complete polymerization of the resin material. For example, for a reactive resin composition that includes caprolactam, the residence time of the coated fabric or mat in the curing oven may be about 3 minutes to ensure the complete polymerization of caprolactam.

As noted above, when the reactive resin composition is a combination of two or more types of reactive monomers and/or oligomers, the heating temperature of the resin-fiber mixture may be chosen to be above a threshold polymerization temperature of one type of monomer/oligomer but below a threshold polymerization temperature of the other type of monomer/oligomer. For example, a reactive resin composition that includes both caprolactam and CBT may be heated to 120-170° C., which may polymerize the caprolactam to PA-6 without significantly polymerizing the CBT to polybutylene terephthalate (PBT). The resulting fiber-resin amalgam will include a polymerized resin matrix of PA-6 combined with a polymerizable resin of CBT. The fiber-resin amalgam may be processed into a reactive prepreg that includes a polymerized resin matrix of PA-6 and polymerizable CBT. The reactive prepreg may be incorporated into a fiber-reinforced article, where the processing conditions may include polymerizing the CBT into PBT. In other embodiments, mixtures of monomers and/or oligomers may be used. For example, a mixture of caprolactam and laurolactam may be used, which will copolymerize in the curing oven to form copolymers with tailored properties.

In some embodiments, the coated fabric or mat 4 is subjected to a press mechanism that facilitates in complete wet-out of the reinforcing fibers by the resin. In one embodiment, the press mechanism may include one or more calendars that press or squeeze the resin through the fabric or mat 4. In another embodiment, the curing oven 8 may be a double belt compression oven where the pressure on the belts is adjustable to facilitate complete wet-out of the reinforcing fibers by the resin. The exposure of the coated fabric or mat to ambient moisture may be minimized by using double belt press that is oil or electrically heated.

Upon exiting the curing oven 8, the fully cured prepreg 9 may be collected. In some embodiments, the system includes a winding mechanism that is configured to wind the fully cured prepreg 9, which is relatively flexible in comparison with conventional prepregs, due to the high content of reinforcing fibers that can be achieved with the process in the instant invention. In other embodiments, the fully cured prepreg may be cut into sheets, which may be stacked atop one another.

The systems of FIGS. 1A and 1B are designed so that the above process is able to be performed in a time of 20 minutes or less, and more commonly 10 minutes or less. In some embodiments, the process may be performed in 5 minutes or less. Specifically, the time period between when the fabric or mat 4 is initially unwound to when the prepreg exits the curing oven 8 may be 20 minutes or less, 10 minutes or less, or in some embodiments 5 minutes or less. This speed and impregnation efficiency is not achievable via conventional systems using polymer resin materials. Moreover, the speed and efficiency is not drastically affected when multiple stacked layers of the fabric or mat 4 are employed. Rather, the low viscosity resin mixture is able to easily penetrate through and saturate the multiple stacked layers of fabric or mat 4 so that the processing time of the stacked layers of the fabric or mat remains low. Full impregnation of the stacked layers of the fabric or mat 4 is achievable due to the low viscosity of the resin materials.

Exemplary Prepregs

The above system may be used to manufacture a fully impregnated thermoplastic prepreg. The thermoplastic prepreg may include a fabric or mat. In one embodiment, the fabric or mat may include a plurality of rovings that are woven together. Each roving may contain a bundle of continuous glass fibers or any other fibers. In another embodiment, the fabric or mat may include a plurality of entangled and intermeshed fibers that are randomly oriented. The prepreg also includes a thermoplastic polymer that is fully impregnated within the fabric or mat. The thermoplastic polymer is formed by reacting a resin (e.g., caprolactam, CBT, and the like) with an activator and a catalyst to form the thermoplastic polymer (e.g., polyamide-6, PBT, and the like). As described herein, greater than 90%, 95%, 98%, or even 99% of the resin reacts to form the thermoplastic polymer. When the fully impregnated thermoplastic prepreg is subjected to a subsequent heating and/or pressure process, the thermoplastic polymer melts or softens to allow the thermoplastic prepreg to be molded or formed into a composite part.

In some embodiments, the fully impregnated thermoplastic prepreg is a rolled product. The thermoplastic prepreg may be subsequently formed into a composite part. For example, one or more layers of the thermoplastic prepreg may be compression molded into a desired composite part. Exemplary techniques for forming the prepregs into the fiber-reinforced composite articles may include compression molding of a single prepreg layer, multiple prepreg layers, and/or pellets of prepreg material into the fiber-reinforced article. When the prepreg includes polymerized and/or partially-polymerized resin, the compression molding process may include a heating step (e.g., hot pressing) to fully polymerize the resin. Heat may also be used in the compression molding of fully-polymerized prepregs to melt and mold the prepreg into the shape of the final article.

The prepregs may also be used to in conjunction with other fibers and resin materials to make the final composite article. For example, the prepreg may be placed in selected sections of a tool or mold to reinforce the article and/or provide material in places that are difficult to reach for thermoset and/or thermoplastic resins. For example, the prepregs may be applied to sharp corners and other highly structured areas of a mold or layup used in reactive injection molding processes (RIM), structural reactive injective molding processes (SRIM), resin transfer molding processes (RTM), vacuum-assisted resin transfer molding processes (VARTM), spray-up forming processes, filament winding processes, and long-fiber injection molding processes, among others. The prepreg may also be used as local reinforcement or for overmolding during injection and compression molding processes including LFT (long fiber thermoplastic) and D-LFT (direct-long fiber thermoplastic).

Exemplary composite products that may be formed from the prepregs include: automotive components, wind turbine blade components, building and construction components, electrical components, sports and leisure components, and/or other components. Exemplary automotive components includes: cockpit, seats, instrument panels, side beams, bottom plate, bottom plate side beam, door trims, body panels, openings, underbody, front/rear modules, engine compartment, engine covers, battery trays, oil pans, bonnets/hoods, fenders, spoilers, and the like.

Exemplary wind turbine blade components include: spar cap, shells, root inserts, and the like. Exemplary building and construction components include: columns, pediments, domes, panels, window profiles, ladder rails, and the like. Exemplary electrical components include: light poles, circuit boards, electrical junction boxes, and the like. Exemplary sports and leisure components include: golf club shafts, golf trolleys, and the like. Other components that may be formed form the prepregs include: components for mass transportation, agricultural equipment, and trailers/RV including passenger seats, standbacks, wall claddings, floor panels, large panels for trailer walls, truck and tractor cabs, bus body shells, cargo containers, and the like.

In a specific embodiment, a battery tray or compartment for an electric car or vehicle may be molded using the fully impregnated thermoplastic prepregs described herein. The battery compartment may be molded from a single piece of the prepreg material, thereby eliminating the need to use unidirectional tape on the corners or edges to reinforce these areas of the battery compartment, as is done in conventional processes.

Methods

Figure 2:
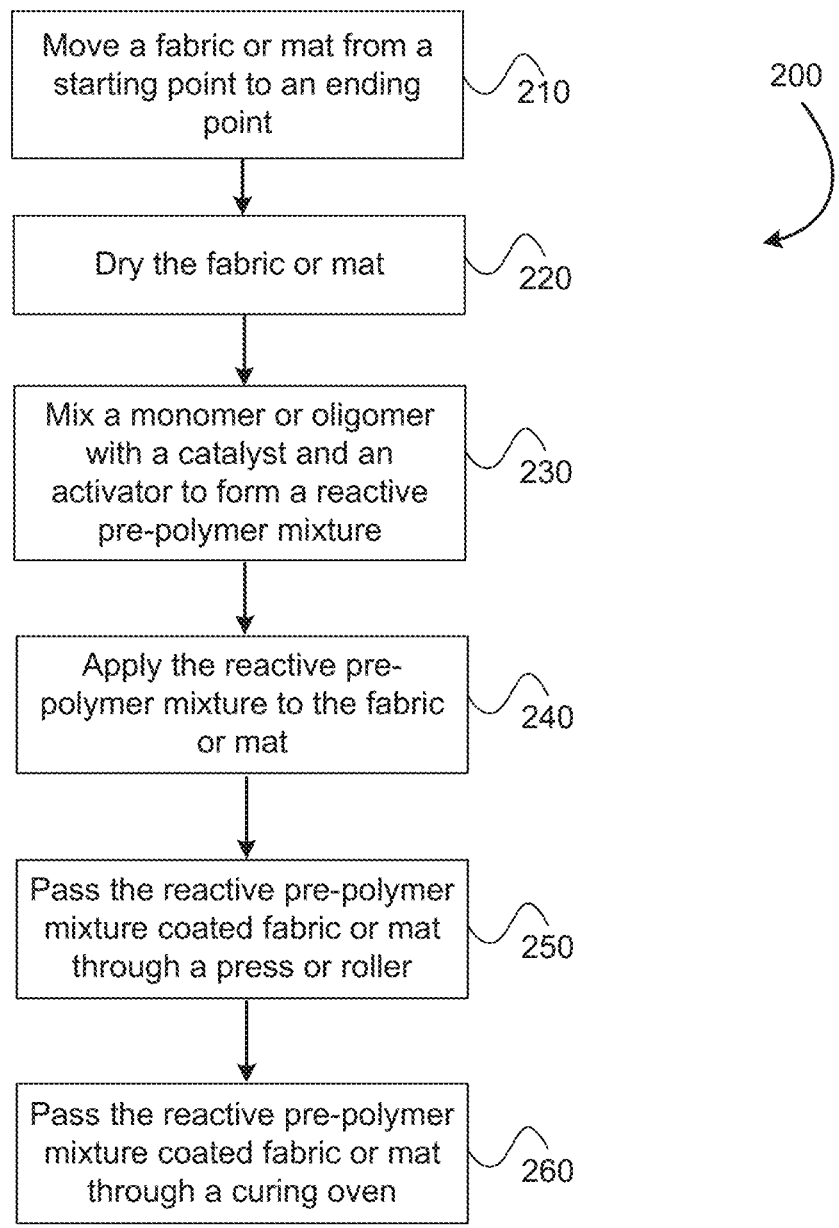
FIG. 2 illustrates a method of forming a fully impregnated thermoplastic prepreg product.

FIG. 2 illustrates a method 200 of forming a fully impregnated thermoplastic prepreg product. At block 210 a fabric or mat is moved from a starting point to an ending point. The fabric or mat is subjected to a plurality of processes between the starting point and ending point and is in substantially constant movement between the starting point and ending point. At block 220, the fabric or mat is dried to remove residual moisture from one or more surfaces of the fabric or mat. At block 230, a monomer or oligomer is mixed with a catalyst and an activator to form a reactive resin mixture. The catalyst and activator facilitate in polymerizing the monomer or oligomer to form a thermoplastic polymer. In some embodiments, a portion of the monomer or oligomer may be mixed with the catalyst in a first tank and a portion of the monomer or oligomer may be mixed with the activator in a second tank that is separate from the first tank. In such embodiments, mixing the monomer or oligomer with the catalyst and the activator comprises mixing the materials from the first tank and the second tank in a static mixer.

At block 240, the reactive resin mixture is applied to the fabric or mat. The reactive resin mixture may have a viscosity of lower than 10 centipoises. At block 250, the reactive resin mixture coated fabric or mat is passed through a calendar or press that presses the reactive resin mixture through the fabric or mat so that the reactive resin mixture fully saturates the fabric or mat. At block 260, the reactive resin mixture coated fabric or mat is passed or moved through a curing oven to polymerize the reactive resin mixture and thereby form the thermoplastic polymer. During at least a portion of the above process, an environment in the vicinity of the coated fabric or mat is controlled to maintain a humidity in the air to substantially zero. Greater than 90%, 95%, 98%, or even 99% of the reactive resin mixture may be reacted to form the thermoplastic polymer.

In some embodiments, the method may also include applying a moisture-free gas to one or more surfaces of the reactive resin mixture coated fabric or mat to control the environment in the vicinity of the fabric or mat. In a specific embodiment, nitrogen gas may be applied to the one or more surfaces of the reactive resin mixture coated fabric or mat. In some embodiments, the method may further include winding the cured thermoplastic prepreg into a roll product. In some embodiments, the curing oven may be a double belt compression oven. In such embodiments, block 250 and 260 may occur simultaneously.

Figure 3:
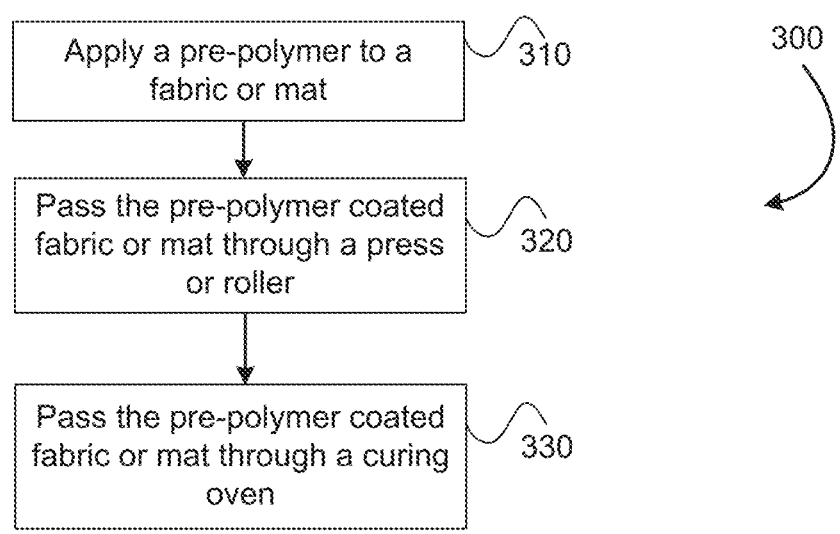
FIG. 3 illustrates another method of forming a fully impregnated thermoplastic prepreg product.

FIG. 3 illustrates another method 300 of forming a fully impregnated thermoplastic prepreg product. At block 310, a reactive resin is applied to a fabric or mat, the resin being combined with a catalyst and an activator that facilitate in polymerizing the resin to form a thermoplastic polymer. The catalyst and activator may be housed in separate holding tanks with or without the resin and may be mixed together with the resin prior to application of the resin to the fabric or mat. Alternatively, the catalyst or the activator may be pre-applied to the fibers of the fabric or mat and the other material may be applied to the fabric or mat with the resin. At block 320, the resin coated fabric or mat is passed or moved through a calendar or press to fully saturate the fabric or mat with the resin. At block 330, the resin coated fabric or mat is passed or moved a curing oven to polymerize the resin and thereby form the thermoplastic polymer. Stated differently, the resin coated fabric or mat is passed or moved through the oven to polymerize the resin and thereby form the polymer. During at least a portion of the above process, humidity in the vicinity of the coated fabric or mat is maintained at substantially zero. In addition, the above process occurs in a time of 20 minutes or less, 10 minutes or less, or 5 minutes or less.

In some embodiments, the method further includes drying the fabric or mat prior to application of the resin to remove residual moisture from one or more surfaces of the fabric or mat. In such embodiments, an infrared heater, pre-drying oven, or other drying device may be used to remove residual moisture from the fabric or mat.

In some embodiments, the method further includes applying a moisture-free gas to one or more surfaces of the fabric or mat to maintain the humidity in the vicinity of the fabric or mat to substantially zero. In such embodiments, nitrogen gas may be blown across or onto one or more surfaces of the coated fabric or mat. In some embodiments, the method additionally includes winding the fully impregnated thermoplastic prepreg into a roll product.

Exemplary Materials and Systems

Uni-directional stitched fabric consisting of 1200 tex glass fiber rovings with the area weight of 670 g/m$^2$ were used for making polyamide-6 prepregs, using the system shown in FIG. 1A. Two heated tanks were used for melting caprolactam-catalyst and caprolactam-activator separately. 1,000 grams of caprolactam (Bruggemann, AP Nylon grade) and 74.0 grams of Bruggolen® C10 catalyst (containing sodium caprolactamate) were added to the first tank. The mixture of caprolactam and C10 was melted at 100° C. Separately, 1,000 grams of caprolactam (Bruggemann, AP Nylon grade) and 27.0 grams of Bruggolen® C20 activator (containing caprolactam hexane di-isocyanate) were added to the second tank. The mixture of caprolactam and C20 was melted at 100° C. The melts from the two tanks were then mixed at 1:1 ratio in a static mixer before the application of the reactive resin mixture on the fabric through a slot die with the opening of 0.33 mm.

A double belt press oven with two Teflon-coated belts was used in the experiments to press and cure the reactive resin mixture. The double belt press was electrically heated and the oven temperature was set at 390° F. The line speed was set such that the residence time of the coated fabric in the oven was approximately 3.5 minutes. The resin application rate was adjusted to achieve a target resin content of 30% in the prepregs.

Example 1

The experiment was run without infrared (IR) heating as shown in FIG. 1A. The residual moisture on the fabric negatively impacted the anionic polymerization of caprolactam. A significant amount of caprolactam fume was observed at the exit of the double belt press oven; and sticking of the coated fabric to the belts was observed. The caprolactam fume at the oven exit indicates an incomplete polymerization of caprolactam.

Example 2

The experiment was run with IR heating and the fabric was heated to the temperature of 330° F. prior to the application of the reactive resin mixture. The slot die was placed about 10 inches away from the inlet of the oven. No nitrogen purging or box enclosure was used to prevent the exposure of the coated fabric to ambient moisture. A significant amount of caprolactam fume was observed at the exit of the double belt press oven; and sticking of the coated fabric to the belts was observed. The caprolactam fume at the oven exit indicates an incomplete polymerization of caprolactam.

Example 3

Figure 4:
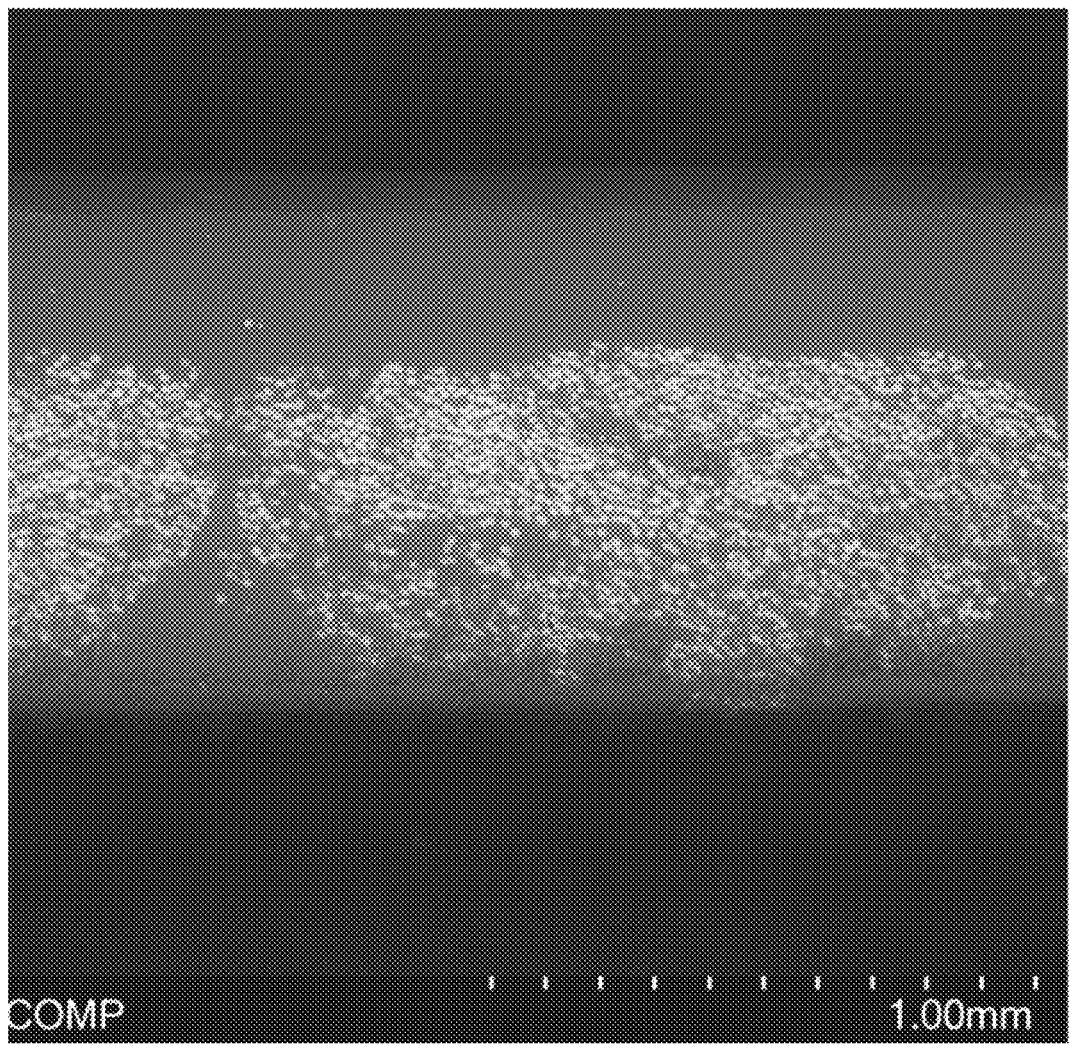
FIG. 4 illustrates a SEM micrograph of a cross-section of a fully impregnated polyamide-6 prepreg.

The experiment was run with IR heating and the fabric was heated to the temperature of 330° F. prior to the application of the reactive resin mixture. The slot die was placed within 1.0 inch from the inlet of the oven. Nitrogen was blown onto the coated fabric through perforated holes on a stainless steel tube, to prevent the exposure of the coated fabric to ambient moisture. Complete polymerization was achieved and minimal amount of caprolactam fume was observed at the exit of the double belt press oven. No sticking of the coated fabric to the belts was observed. Scanning electron microscopy (SEM) analysis was conducted on the resulting prepregs to examine the impregnation. FIG. 4 is a typical SEM micrograph of the cross-section of the prepreg, which indicates the complete impregnation of the fabric with thermoplastic polyamide-6 resin.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the glass fiber" includes reference to one or more glass fibers and equivalents thereof known to those skilled in the art, and so forth. The invention has now been described in detail for the purposes of clarity and understanding. However, it will be appreciated that certain changes and modifications may be practice within the scope of the appended claims.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of forming a fully impregnated thermoplastic prepreg product comprising:
    moving a fabric or mat from a starting point to an ending point, wherein the fabric or mat is subjected to a plurality of processes and wherein the fabric or mat is in substantially constant movement between the starting point and ending point;
    drying the fabric or mat to remove residual moisture from the fabric or mat;
    mixing a liquid or molten lactam with a catalyst and an activator via a mixing component to form a reactive resin mixture, the catalyst and activator facilitating in polymerizing the liquid or molten lactam to form a thermoplastic polymer;
    applying the reactive resin mixture to the fabric or mat via a resin application die that is positioned above the fabric or mat so that the reactive resin mixture is applied to the fabric or mat as the fabric or mat is passed under the resin application die, the reactive resin mixture having a viscosity of 10 centipoises or less;
    blowing, via a gas application mechanism, a moisture-free gas onto one or more surfaces of the fabric or mat after application of the reactive resin mixture and prior to passing the fabric or mat through a curing oven, the moisture-free gas being blown onto the fabric or mat to substantially prevent exposure of the reactive resin mixture to ambient moisture in a surrounding environment;
    passing the fabric or mat through a calendar or press to press the reactive resin mixture entirely through the fabric or mat such that the reactive resin mixture fully saturates the fabric or mat; and
    passing the fabric or mat through the curing oven to polymerize the reactive resin mixture and thereby form the thermoplastic polymer;
    wherein the mixing component and the resin application die are heated to maintain a temperature of the liquid or molten lactam to between 70 and 120 degrees Celsius.

2. The method of claim 1, wherein a portion of the liquid or molten lactam is mixed with the catalyst in a first tank and a portion of the liquid or molten lactam is mixed with the activator in a second tank that is separate from the first tank, and wherein mixing the liquid or molten lactam with the catalyst and the activator comprises mixing the materials from the first tank and the second tank in the mixing component, wherein the first holding tank and the second holding tank are heated to maintain a temperature of the lactam to between 70 and 120 degrees Celsius.

3. The method of claim 1, wherein nitrogen gas is applied to the one or more surfaces of the fabric or mat.

4. The method of claim 1, wherein the curing oven comprises a double belt compression oven.

5. The method of claim 1, further comprising winding the fully impregnated thermoplastic prepreg into a roll product.

6. The method of claim 1, wherein greater than 95% of the liquid or molten lactam is polymerized to form the thermoplastic polymer.

7. The method of claim 1, wherein the liquid or molten lactam comprises caprolactam.

8. A method of forming a fully impregnated thermoplastic prepreg product comprising:
    drying a fabric or mat to remove residual moisture from the fabric or mat;
    applying a liquid or molten resin to the fabric or mat via a resin application mechanism;
    blowing, via a gas application mechanism, a moisture-free gas onto one or more surfaces of the fabric or mat after application of the liquid or molten resin and prior to passing the fabric or mat through a curing oven to substantially prevent exposure of the liquid or molten resin to ambient moisture in a surrounding environment;
    passing the fabric or mat through a calendar or press to fully saturate the fabric or mat with the resin; and
    passing the fabric or mat through the curing oven to polymerize the resin and thereby form the thermoplastic polymer;

wherein the gas application mechanism is positioned such that the moisture-free gas is blown onto the one or more surfaces of the fabric or mat between the resin application mechanism and the curing oven; and wherein the above process occurs in a time of less than 10 minutes.

9. The method of claim 8, further comprising combining a catalyst and an activator with the liquid or molten resin prior to applying the liquid or molten resin to the fabric or mat.

10. The method of claim 8, wherein the fabric or mat includes sized fibers containing an activator and wherein the method includes applying the liquid or molten resin to the fabric or mat made of the sized fibers.

11. The method of claim 8, further comprising winding the fully impregnated thermoplastic prepreg into a roll product.

12. The method of claim 8, wherein the liquid or molten resin comprises caprolactam.

13. A method of forming a fully impregnated thermoplastic prepreg product comprising:

moving a fabric or mat from a starting point to an ending point, wherein the fabric or mat is subjected to a plurality of processes and wherein the fabric or mat is in substantially constant movement between the starting point and ending point;

drying the fabric or mat to remove residual moisture from the fabric or mat;

mixing a liquid or molten lactam with a catalyst and an activator via a mixing component to form a reactive resin mixture, the catalyst and activator facilitating in polymerizing the liquid or molten lactam to form a thermoplastic polymer;

applying the reactive resin mixture to the fabric or mat via a resin application die that is positioned above the fabric or mat so that the reactive resin mixture is applied to the fabric or mat as the fabric or mat is passed under the resin application die, the reactive resin mixture having a viscosity of 10 centipoises or less;

blowing, via a gas application mechanism, a moisture-free gas onto one or more surfaces of the fabric or mat, the gas application mechanism being positioned such that the moisture-free gas is blown onto the fabric or mat after application of the reactive resin mixture and prior to passing the fabric or mat through a curing oven, the moisture-free gas being blown onto the fabric or mat substantially prevent exposure of the reactive resin mixture to ambient moisture in a surrounding environment;

passing the fabric or mat through a calendar or press to press the reactive resin mixture entirely through the fabric or mat such that the reactive resin mixture fully saturates the fabric or mat; and passing the fabric or mat through the curing oven to polymerize the reactive resin mixture and thereby form the thermoplastic polymer;

wherein the mixing component and the resin application die are heated to maintain a temperature of the liquid or molten lactam to between 70 and 120 degrees Celsius.

* * * * *